(12) United States Patent
DeRubes et al.

(10) Patent No.: US 9,623,342 B2
(45) Date of Patent: Apr. 18, 2017

(54) TRACK ASSEMBLIES AND TRACK ASSEMBLY KITS FOR CHILDREN'S RIDE-ON VEHICLES

(71) Applicant: Mattel, Inc., El Segundo, CA (US)

(72) Inventors: John D. DeRubes, Grand Island, NY (US); Kevin M. Gastle, Boston, NY (US)

(73) Assignee: Mattel, Inc., El Segundo, CA (US)

( * ) Notice: Subject to any disclaimer, the term of this patent is extended or adjusted under 35 U.S.C. 154(b) by 282 days.

(21) Appl. No.: 14/272,740

(22) Filed: May 8, 2014

(65) Prior Publication Data

US 2015/0135982 A1 May 21, 2015

Related U.S. Application Data

(60) Provisional application No. 61/905,665, filed on Nov. 18, 2013.

(51) Int. Cl.
*A63H 18/02* (2006.01)
*A63G 25/00* (2006.01)
*B62K 9/00* (2006.01)

(52) U.S. Cl.
CPC ............. *A63H 18/02* (2013.01); *A63G 25/00* (2013.01); *B62K 9/00* (2013.01)

(58) Field of Classification Search
CPC ................................ A63H 18/02; A63G 25/00
USPC ............................................. 238/10 A, 10 E
See application file for complete search history.

(56) References Cited

U.S. PATENT DOCUMENTS

| 1,575,089 | A | * | 3/1926 | Bbcker | A63H 19/30 238/10 E |
| 1,647,097 | A | * | 10/1927 | Kachman | A63H 19/30 238/10 E |
| 1,707,615 | A | | 4/1929 | Hunt | |

(Continued)

OTHER PUBLICATIONS

Fisher-Price Thomas & Friends Thomas the Tank Engine Owner's Manual with Assembly Instructions for Model T4963, pp. 1-20, 2010.

(Continued)

*Primary Examiner* — Zachary Kuhfuss
(74) *Attorney, Agent, or Firm* — Dascenzo Intellectual Property Law, P.C.

(57) ABSTRACT

Track assemblies and track assembly kits for children's ride-on vehicles, as well as children's ride-on vehicle systems, according to the present disclosure are configured for assembly and disassembly of a track assembly. Track assemblies may include elongate rail members, couplers that are configured to couple together two elongate rail members, and optionally tie members that include one or more couplers. Generally, track assemblies comprise a left rail (including longitudinally aligned elongate rail members) and a right rail (including longitudinally aligned elongate rail members) in a spaced-apart and parallel relationship. Elongate rail members, couplers, and/or tie members are configured to releasably and repeatedly couple together. In the disassembled state, the component parts may be stored and/or shipped compactly. In the assembled state, the track assembly may define a track path, and the track assembly may be configured to guide the children's ride-on vehicle along the track path.

19 Claims, 5 Drawing Sheets

(56) References Cited

U.S. PATENT DOCUMENTS

| | | | |
|---|---|---|---|
| 1,865,277 A * | 6/1932 | Rosenthal | A63H 19/30 238/10 E |
| 2,318,958 A | 5/1943 | Murphy | |
| 2,333,504 A | 11/1943 | Alben | |
| 2,540,433 A * | 2/1951 | Evans | A63H 19/30 238/10 B |
| 2,787,970 A | 4/1957 | Bennett | |
| 2,882,089 A | 4/1959 | Vaszin | |
| 3,218,757 A | 11/1965 | Benkoe | |
| 3,464,624 A * | 9/1969 | Godtfred | A63H 18/023 238/10 E |
| 3,589,064 A | 6/1971 | Harada | |
| 3,592,384 A | 7/1971 | Tomaro | |
| 3,684,173 A | 8/1972 | Casadio | |
| 4,212,250 A | 7/1980 | Burgess | |
| 4,260,104 A | 4/1981 | Schaffan | |
| 4,357,877 A | 11/1982 | Mariol | |
| 4,403,733 A | 9/1983 | Bach et al. | |
| 4,417,523 A | 11/1983 | Mariol | |
| 5,016,540 A | 5/1991 | Barber | |
| 5,232,154 A * | 8/1993 | Jenkins | E01B 23/02 104/62 |
| 5,440,996 A | 8/1995 | Cottino | |
| 5,463,961 A | 11/1995 | Graves | |
| 5,644,114 A | 7/1997 | Neaves | |
| 5,935,012 A * | 8/1999 | Cohn | A63G 1/34 104/53 |
| 6,105,982 A | 8/2000 | Howell et al. | |
| 6,264,330 B1 | 7/2001 | Walton et al. | |
| 6,509,719 B2 | 1/2003 | Crofut et al. | |
| 6,554,087 B2 | 4/2003 | Huntsberger et al. | |
| 6,631,925 B1 | 10/2003 | Lawson, Jr. | |
| 6,755,265 B2 | 6/2004 | Huntsberger et al. | |
| 6,771,034 B2 | 8/2004 | Reile et al. | |
| 7,083,111 B2 * | 8/2006 | Reisher | A63H 18/08 104/60 |
| 7,216,878 B2 | 5/2007 | Damon | |
| 7,413,041 B2 | 8/2008 | Drosendahl et al. | |
| 7,562,629 B2 | 7/2009 | Lohr et al. | |
| 7,568,753 B2 | 8/2009 | Arendt et al. | |
| 7,752,978 B2 | 7/2010 | Schroeder | |
| 7,905,305 B2 | 3/2011 | Lucas et al. | |
| 7,939,008 B2 | 5/2011 | Arendt et al. | |
| 8,069,793 B2 | 12/2011 | Rice | |
| 8,164,429 B2 | 4/2012 | Reynolds et al. | |
| 8,382,005 B1 | 2/2013 | Fletcher | |
| 9,220,991 B2 * | 12/2015 | Gastle | A63H 17/26 |
| 2005/0197042 A1 | 9/2005 | Larsen | |
| 2006/0230974 A1 | 10/2006 | Murray | |
| 2010/0248586 A1 | 9/2010 | Cochella | |
| 2010/0282120 A1 | 11/2010 | Micheletti | |
| 2011/0048820 A1 | 3/2011 | Harris | |
| 2012/0171922 A1 | 7/2012 | Schlegel et al. | |
| 2015/0135981 A1 * | 5/2015 | Gastle | A63H 17/26 104/53 |
| 2015/0135984 A1 * | 5/2015 | Gastle | B61B 13/00 104/242 |

OTHER PUBLICATIONS

Talking Train with Track—Kidz Motorz—Toys "R" Us (0236), pp. 1-8, downloaded from http://www.toysrus.com/buy/bikes-scooters-ride-ons/powered-riding-toys/powered-riding-toys/talking-train-with-track-0236-3370312, on or about May 10, 2013.

Amazon.com: New Star My Mini Express Train with Trailer—Red: Toys . . . , pp. 1-4, downloaded from http://www.amazon.com/New-Star-Express-Train-Trailer/dp/B001W7VAE0/ref=sr_1_10?s=toys-and-games&ie=UTF8&qid=1370904356&sr=1-10, on or about Jun. 10, 2013.

Peg Perego 2010 Catalog, cover and pp. 1, 2-3, and 10-11, downloaded from http://wwvv.pegperegousa.com/admin/archive/downloads/ToysCatalofUsCa2010.pdf, on or about Jun. 6, 2013.

Peg Perego Choo Choo Express Train Manual (Model No. IGED 1116), pp. 1-24, circa 2006, downloaded from http://peg-peregoparts.com/manuals/IGED1116.pdf on or about Jun. 6, 2013.

Peg Perego Santa Fe Express Train Set Manual (Model No. IGED 1080), pp. 1-12, circa 2006, downloaded from http://peg-peregoparts.com/manuals/IGED1080.pdf on or about Jun. 6, 2013.

Peg Perego Santa Fe Train Set Manual (Model No. IGED 1084), pp. 1-12, circa 2006, downloaded from http://peg-peregoparts.com/manuals/IGED1084.pdf on or about Jun. 6, 2013.

Playskool Ride Around Train Instructions, pp. 1-2, circa 1992, downloaded from http://www.hasbro.com/common/instruct/RideAroundTrain.pdf, on or about Jun. 10, 2013.

ebay Playskool Ride on Train Battery Toddlers Brightly Colored Track Train Engine1991, pp. 1-6, downloaded from http://www.ebay.com/itm/Playskool-Ride-Train-Battery-Toddlers-Brightly-Colored-Track-Train-Engine1991-/390580227925#vi-content, on or about Jun. 10, 2013.

Talking Train User Manual, pp. 1-8, circa 2008, downloaded from http://www.funcreation.net/talkingtrain.html, on or about Jun. 6, 2013.

Thomas Track Rider Parts Diagram (Model No. 35168), Peg-PeregoParts.com, pp. 1-2, downloaded from http://peg-peregoparts.com/diagram.php?num=3516800 on or about Jun. 6, 2013.

\* cited by examiner

TRACK ASSEMBLIES AND TRACK ASSEMBLY KITS FOR CHILDREN'S RIDE-ON VEHICLES

RELATED APPLICATION

The present application claims priority under 35 U.S.C. §119(e) to U.S. Provisional Patent Application No. 61/905,665, which is entitled "TRACK ASSEMBLIES AND TRACK ASSEMBLY KITS FOR CHILDREN'S RIDE-ON VEHICLES," which was filed on Nov. 18, 2013, and the disclosure of which is hereby incorporated by reference.

FIELD

The present disclosure relates to children's ride-on vehicles, and more particularly to track assemblies for children's ride-on vehicles.

BACKGROUND

Children's ride-on vehicles are reduced-scale vehicles that are designed for use by children. For example, children's ride-on vehicles include a seat which is adapted to accommodate one or more children, and steering and drive assemblies that are adapted to be operated by a child sitting on the seat. One type of drive assembly that often is used in children's ride-on vehicles includes a battery-powered motor assembly that, when energized, may power one or more driven wheels of the children's ride-on vehicle. To operate a battery-powered children's ride-on vehicle, a child will sit on the vehicle's seat and. by pressing a pedal or moving a switch or button on a control panel, the vehicle's motor assembly is energized by the battery source. The child then drives the vehicle in much the same way as an adult operates an automobile.

Children's ride-on vehicles come in many different shapes and sizes to accommodate children of different ages and sizes. When a child, and especially a young child, is first learning to operate a motorized ride-on vehicle, the child may be unaccustomed to controlling and steering the vehicle. Also, a parent may not want to permit the child to drive the children's ride-on vehicle in an unrestricted indoor and/or outdoor territory. Thus, children's ride-on vehicles may form a portion of a play system that also includes a track that defines a boundary for the path of movement of the children's ride-on vehicle. Conventionally, such tracks come in pre-assembled track sections that include lengths of spaced-apart rails with a series of ties or other supports extending between the rails. A series of such conventional track sections may be interconnected to define a circuitous (e.g., looped, winding) path along which a child may drive a children's ride-on vehicle. When the track is not being used, such as when the ride-on vehicle is operated by a more experienced rider and/or when the track is being shipped, transported, or stored, these track sections tend to require considerable space. The conventional track sections also pre-define the path of travel established by each individual track section by utilizing a predefined, permanent orientation and length for the rails and ties of each track section.

SUMMARY

Track assemblies and track assembly kits for children's ride-on vehicles, as well as children's ride-on vehicle systems, according to the present disclosure are configured for assembly and disassembly of a track assembly. Track assembly kits and children's ride-on vehicle systems include components to construct a track assembly. Track assemblies may include a plurality of elongate rail members and a plurality of couplers that are configured to couple together two elongate rail members. Track assemblies also may include tie members that include one or more couplers and that are configured to longitudinally couple a first set of elongate rail members (e.g., a left rail) and to longitudinally couple a second set of elongate rail members (e.g., a right rail) in a spaced-apart and parallel relation to the first set.

Elongate rail members, couplers, and/or tie members cooperatively define one or more coupling mechanisms that are configured to releasably and repeatedly couple the components together. Hence, the track assemblies are configured to be assembled and disassembled. In the disassembled state, the component parts may be stored and/or shipped compactly. In the assembled state, the track assembly may define a track path, which in turn defines a path of travel for a children's ride-on vehicle along the track, and the track assembly may be configured to guide the children's ride-on vehicle along the track path.

DESCRIPTION

FIGS. 1-17 illustrate track assemblies 10 and track assembly kits 12 for children's ride-on vehicles, as well as children's ride-on vehicle systems according to the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one of the figures may be included in and/or used with any of the elements, components, and/or features of another figure without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

Figure 1:
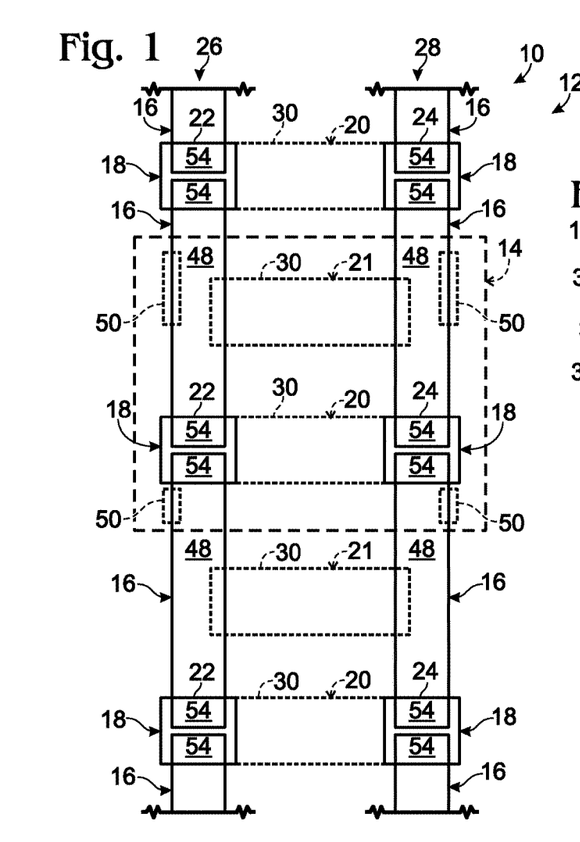
FIG. 1 is a schematic plan view representing track assemblies and track assembly kits for children's ride on vehicles, as well as children's ride-on vehicle systems according to the present disclosure.

FIG. 1 schematically represents a track assembly 10 and also component parts of a track assembly kit 12. A track assembly 10 may be constructed from a track assembly kit 12, which additionally or alternatively may be referred to as a track assemblage 12. A track assembly kit 12 therefore may be described as a track assembly 10 in an unassembled, or disassembled, configuration. Thus, a track assembly kit 12 may be described as including a plurality of component parts that may be assembled together to define a track assembly on which, or in connection with, a children's ride-on vehicle 14 may be operated. Track assemblies may define a track path, which in turn defines a path of travel for a children's ride-on vehicle, and the track assembly may be configured to guide the children's ride-on vehicle along the track path.

In some examples, the component parts of track assembly 10 and/or a track assembly kit 12 may be assembled together in more than one configuration and/or more than one track path. Additionally or alternatively, a track assembly 10 may be assembled from fewer than all of the component parts of a track assembly kit. As illustrative, non-exclusive examples, track assemblies 10 may be assembled in more than one way to define different configurations and/or track paths, e.g., closed loops and/or winding paths of varying size and/or shape. Stated differently, a track assembly kit may be configured to permit the construction of more than one configuration of track assembly.

Track assemblies 10 and track assembly kits 12 each include a plurality of elongate rail members 16 and a plurality of couplers 18. Each coupler 18 is configured to operatively and longitudinally couple together two elongate rail members 16. Because track assemblies and track assembly kits may be configured to be assembled and disassembled, components of track assemblies and track assembly kits generally are configured to be releasably and repeatedly coupled.

In some embodiments, track assembly 10 may include a plurality of tie members 20, each with a left end region 22 including a coupler 18 (also referred to as a left coupler) and a right end region 24 including a coupler 18 (also referred to as a right coupler). Tie members 20 may be elongate and hence referred to as elongate tie members. However, tie members 20 are not required in all embodiments to be elongate, so long as the tie members extend between adjacent elongate rail members to maintain the elongate rail members in a spaced-apart relationship that defines a gauge (the spacing between rails) for a corresponding assembled track section. Accordingly, when provided, the tie members may be utilized to interconnect two subsets of elongate rail members that respectively are longitudinally coupled together. Stated differently, a first subset of elongate rail members may be longitudinally coupled together by tie members to define a left rail 26 and a second subset of elongate rail members may be longitudinally coupled together by tie members to define a right rail 28, with the tie members laterally spacing apart the left and right rails in a parallel relationship. As used herein, a parallel relationship of rails includes substantially parallel straight rails, substantially parallel curved rails, a defined distance between rails, a substantially constant gauge, and rails in which the gauge varies along the length of the rails.

Additionally or alternatively, a track assembly 10 may include a plurality of auxiliary tie members 21 that do not include couplers 18 but that are configured to span between, operatively space, and operatively couple together the left rail 26 and the right rail 28 of a track assembly, as schematically and optionally illustrated in FIG. 1.

Generally, track assemblies 10 comprise elongate rail members 16, couplers 18, and optional tie members 20 arranged to form a track assembly with two substantially parallel rails (e.g., the left rail 26 and the right rail 28) and a track base 30 (the portion of the track assembly that supports the rails, e.g., the tie members). The rails generally protrude and/or extend above the track base when the track is in an operational position (e.g., lying on a floor, driveway, or other ground surface).

Figure 2:
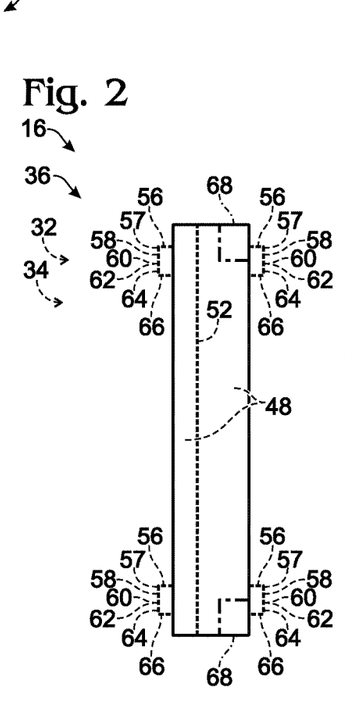
FIG. 2 is a schematic plan view representing rail members that are straight.
Figure 3:
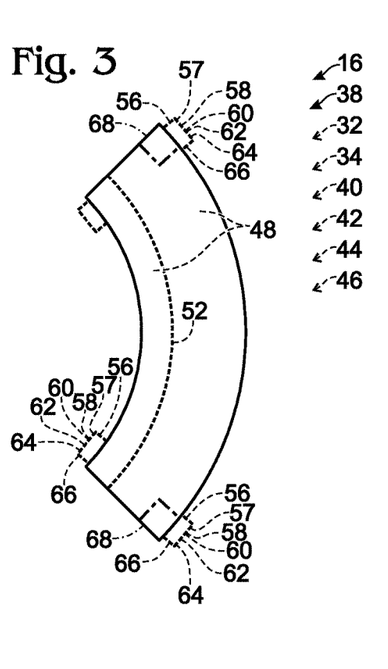
FIG. 3 is a schematic plan view representing rail members that are curved.

The elongate rail members 16 of a track assembly 10 and track assembly kit 12 may include various sizes, lengths, widths, shapes, type, and configurations of elongate rail members. In some track assemblies 10 and track assembly kits 12, the elongate rail members may all be identically configured. In other track assemblies and track assembly kits, more than one configuration of elongate rail member may be provided. For example, the plurality of elongate rail members 16 of a track assembly kit 12, and thus of a corresponding track assembly 10, may include one or more left rail members 32, right rail members 34, straight rail members 36 (as depicted in FIG. 2), curved rail members 38 (as depicted in FIG. 3), outer curve rail members 40, inner curve rail members 42, curved rail members 44 with a relatively larger radius of curvature, and curved rail members 46 with a relatively smaller radius of curvature, and/or a set of the foregoing. In some examples, the various types and/or sets of elongate rail members 16 are not necessarily mutually exclusive. For example, a left rail member may be a straight rail member or a curved rail member. Similarly, a right rail member may be a straight rail member or a curved rail member. Sets, and hence track assemblies and track assembly kits, may include at least 2, at least 3, at least 4, at least 6, at least 8, at least 10, at least 16, at least 20, or at least 30 elongate rail members.

Track assemblies 10 and track assembly kits 12 generally define a left rail 26 and a right rail 28 and hence may include an even number of elongate rail members 16 (at least one elongate rail member for the left rail and at least one elongate rail member for the right rail). Generally, at least one tie member 20 couples, and/or is configured to couple, each pair of elongate rail members. Similarly, each elongate rail member is coupled, and/or is configured to couple, two tie members. Hence, track assemblies and track assembly kits may include twice as many elongate rail members as tie members. The left rail and the right rail may cooperatively form different types of track sections, e.g., a straight track section or a curved track section. Track sections typically have a substantially constant track gauge. However, individual track sections may independently have the same, similar, or different track gauges. For example, a straight track section may have a different track gauge than one or more curved track sections. When track assemblies include track sections with different track gauges, the track assemblies may include a transition track section (or a transition zone) with a track gauge that varies between one track gauge at one longitudinal end to another track gauge at the other longitudinal end. For example, if a straight track section defines a first track gauge and a curved track section defines a second track gauge, the transition track section may span the first and second track gauges such that a children's ride-on vehicle would not experience any substantial discontinuity in the track gauge.

As schematically represented in FIGS. 2-3, elongate rail members 16 and/or couplers 18 (and/or tie members 20) may be keyed, define a key structure 68, or otherwise configured for only proper alignment and engagement therebetween. Key structures generally present an asymmetric interface such that an elongate rail member is able to be coupled to the coupler (and/or tie member) in only a single, and proper, orientation (e.g., the operational position, not upside down, backwards, or mismatched).

As schematically represented in FIGS. 2-3, the elongate rail members 16 each may include a support surface 48 that is configured to support a wheel, or wheels, 50 of a children's ride-on vehicle when the children's ride-on vehicle is used with the assembled track and driven on the support surface. Typically, the support surface is a generally flat surface that is at least substantially parallel to the ground surface on which a track assembly is positioned, and therefore, the engagement between wheels 50 and the support surface is facilitated by gravity. When included in elongate rail members 16, support surface 48 may maintain, or at least assist in maintaining, an assembled track in a selected position on a ground surface. For example, because the children's ride-on vehicle's wheels travel along the support surface, the weight of the children's ride-on vehicle and the child rider will bear on the support surface to maintain the assembled track in position.

Figure 4:
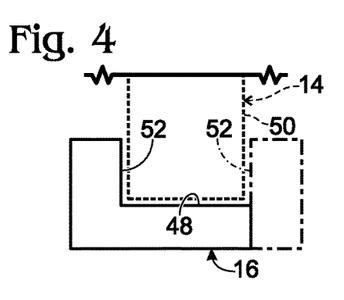
FIG. 4 is a schematic profile view representing one illustrative, non-exclusive example of elongate rail members and the interface with a wheel of a children's ride-on vehicle.
Figure 5:
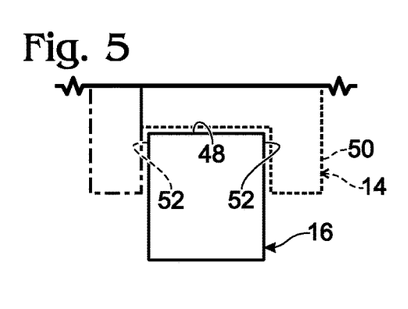
FIG. 5 is a schematic profile view representing another illustrative, non-exclusive example of elongate rail members and the interface with a wheel of a children's ride-on vehicle.

As schematically illustrated in FIGS. 4-5, in some embodiments, at least a subset of the elongate rail members may include a guide surface 52 that is configured to engage and guide a wheel or wheels 50 of a children's ride-on vehicle. For example, the guide surface may be configured, shaped, and/or positioned to engage a lateral side of one or more wheels of a children's ride-on vehicle when the children's ride-on vehicle is driven on an assembled track.

Guide surfaces may be configured to be selectively engaged by a sidewall or other portion of at least one wheel of the children's ride-on vehicle when, or at least a substantial portion of the time that, the children's ride-on vehicle is driven on an assembled track, e.g., to define and/or correct a path of travel of the ride-on vehicle along the assembled track. Guide surfaces of a track assembly may define at least a portion of the track path of the track assembly. Guide surfaces may be configured to be selectively engaged by a wheel of a children's ride-on vehicle to guide a path of travel of the children's ride-on vehicle only when the wheel is steered along a path of travel that does not correspond to the track path defined by the track assembly, e.g., when the wheel is steered or otherwise oriented away from the track path.

Guide surfaces 52, when present, may extend at any suitable angle and/or with any suitable shape relative to support surfaces 48 (when present) or other portion of the elongate rail member and/or relative to the wheels of a children's ride-on vehicle when the children's ride-on vehicle is driven on an assembled track. As illustrative, non-exclusive examples, guide surface 52 may extend transverse to the support surface, perpendicular to the support surface, at an obtuse exterior angle relative to the support surface, at an acute exterior angle relative to the support surface, or at an exterior angle that is a reflex angle (greater than 180°). It is within the scope of the present disclosure that an elongate rail member may include more than one guide surface 52, such as a pair of spaced-apart and/or generally opposed guide surfaces, as schematically and optionally illustrated in dash-dot lines in FIGS. 4-5. When an elongate rail member includes a pair of guide surfaces 52, the guide surfaces may have the same, opposed, or different orientations and/or shapes. When an elongate rail member includes a pair of guide surfaces 52, the guide surfaces and elongate rail member may be configured to engage opposed sidewalls or other regions of the same wheel(s) of a children's ride-on vehicle (such as when the wheel travels in a central region of the elongate rail member between the spaced-apart guide surfaces), or the pair of guide surfaces may be configured to engage sidewalls or other regions of different wheels of the children's ride-on vehicle (such as the inner or outer sidewalls of the front and/or rear wheels of a children's ride-on vehicle).

In some track assembly kits and track assemblies, only a subset of the elongate rail members may include guide surfaces. For example, one of a set of left rail members 32 or a set of right rail members 34 may include guide surfaces, while the other of the set of left rail members 32 and the set of right rail members 34 may not include guide structures. Moreover, the wheels 50 of a children's ride-on vehicle may be specifically configured for engagement with the guide surfaces, including embodiments in which only one of the left wheels or the right wheels of a children's ride-on vehicle are configured for engagement with corresponding guide surfaces.

It is within the scope of the present disclosure that the elongate rail members 16 may include a support surface 48 but no guide surface 52, a guide surface 52 but no support surface, or a pair of guide surfaces with or without one or two support surfaces.

In some track assembly kits and track assemblies, the elongate rail members 16, or at least a subset thereof, may be configured to be stacked and/or nested together, for example for storage and/or shipment. Similarly, the tie members 20, or at least a subset thereof, when present, may be configured to be stacked and/or nested together, for example, for storage and/or shipment.

As schematically illustrated in FIG. 1, couplers 18 may take any suitable configuration such that they are configured to operatively, longitudinally, releasably, repeatedly, and/or manually couple together two elongate rail members 16. In some embodiments, the couplers are configured to operatively, longitudinally, releasably, repeatedly, and/or manually couple together two elongate rail members without the aid of a tool, such as a screw driver, wrench, hammer, etc. Additionally or alternatively, in some embodiments, the couplers are configured to operatively and longitudinally couple together two elongate rail members without separate fasteners, such as screws, bolts, clips, rivets, pegs, pins, bands, ties, caps, etc. (i.e., only the elongate rail members and the couplers may be needed to releasably interlock and couple together the elongate rail members and the couplers). Additionally or alternatively, some embodiments of couplers may include integral fasteners. In some embodiments, each elongate rail member is configured to be manually coupled to and manually decoupled from a coupler. Additionally or alternatively, in some embodiments, each elongate member is configured to be coupled to a coupler in a snap-fit arrangement and/or a friction-fit arrangement. Couplers 18 are configured to be repeatedly coupled to and released from engagement with the elongate rail members, optionally manually and without tools, without damage to or destruction of the couplers, the elongate rail members, or any tie members that include the couplers.

Elongate rail members 16 may be configured to be coupled to a pair of couplers 18, e.g., a coupler at each longitudinal end of the elongate rail member. One or more couplers may be situated at the ends (e.g., the left end region and the right end region) of tie members 20 and hence tie members 20 may be configured to couple at least a pair of elongate rail members, e.g., two longitudinally aligned elongated rail members, and/or a left rail member and a right rail member. Tie members 20 may include at least two couplers, e.g., two couplers, four couplers, six couplers, etc.

Additionally or alternatively, in some embodiments, each coupler is configured to operatively, longitudinally, releasably, repeatedly, and/or manually couple together different sizes and/or types of elongate rail members. For example, a coupler may be configured to couple together two elongate rail members having a first width, as well as being configured to couple together two elongate rail members having a second width that is greater than the first width. As a further example, straight elongate rail members may have a different width, different orientation, and/or define a different gauge than curved elongate rail members as assembled into a track assembly, although this is not required.

Additionally or alternatively, when part of optional tie members 20, couplers 18 may be configured to position longitudinally adjacent elongate rail members 16 in more than one lateral position relative to the tie members. For example, a left rail 26 and a right rail 28 may be selectively spaced apart at more than one distance. Stated differently, a track assembly kit may be configured to construct track assemblies of different widths, or gauges, such as to be utilized with children's ride-on vehicles 14 with different lateral wheel spacings, and/or to allow easier travel and/or more steering freedom over certain sections of the track assembly.

As schematically indicated in FIG. 1, a respective elongate rail member and a respective coupler (and/or a respective tie member) may collectively define a coupling mechanism 54. Accordingly, because each coupler is configured to couple together two elongate rail members (possibly of different types), each coupler is associated with two coupling mechanisms 54. Moreover, in optional embodiments of couplers that are configured to couple together two elongate rail members without separate fasteners, the corresponding coupling mechanisms 54 may be described as being free of separate fasteners. As used herein, references to a "respective" rail member, track section, tie member, coupler, coupling mechanism, release member, etc. refers to one or more corresponding components.

Figure 6:
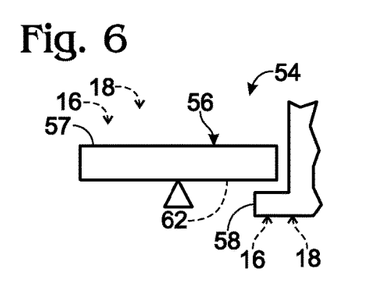
FIG. 6 is a schematic diagram representing illustrative, non-exclusive examples of coupling mechanisms that include a latch.
Figure 7:
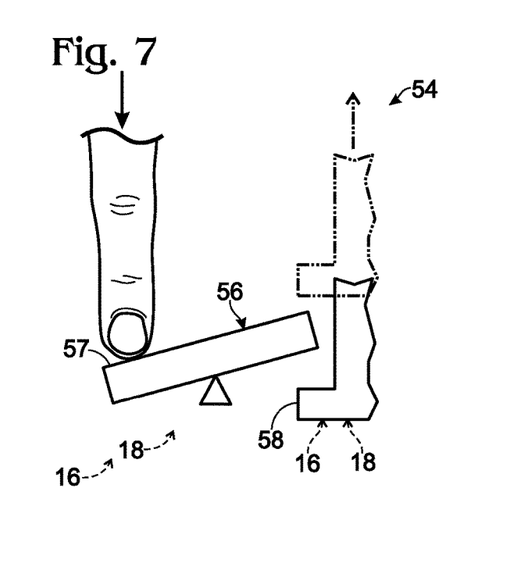
FIG. 7 is a schematic diagram representing the coupling mechanisms of FIG. 6, with the latch engaged by a user to release the coupling mechanism.

In some embodiments, a coupling mechanism 54 may be configured to automatically retain (and hence may include a coupling mechanism retainer configured for such purpose) an elongate rail member coupled to a coupler (and/or tie member 20) when a user selectively urges the elongate rail member toward the coupler (and/or tie member) or the coupler (and/or tie member) toward the elongate rail member. Additionally or alternatively, the coupling mechanism may be configured to release the elongate rail member from the coupler (and/or tie member) only upon user engagement of the coupling mechanism. FIGS. 6-7 illustrate such an arrangement in the case of a coupling mechanism that includes a latch 56, with the latch schematically represented as a lever that is pivotal relative to a fulcrum, and with the latch selectively retaining a catch structure 58; however, other configurations also are within the scope of the present disclosure. The coupling mechanism may include an actuator, or release member, 57 that is configured to release (typically manually release) the elongate rail member from the coupler (and/or tie member). Actuators generally include a user-engagement region that a user physically contacts to actuate the coupling mechanism, as schematically illustrated in FIGS. 6-7. For example, the actuator may include a lever, button, push button, pivot, depressible member, depressible region, and/or slide. In some embodiments, the coupling mechanism is configured to automatically receive and secure the elongate rail member when the rail member is urged against the coupler, but to not release the rail member unless a user has exerted the specific force on the actuator.

Coupling mechanisms 54 may include mating structures, such as one or more of a latch 56, a catch 58, a latch and a catch, a protrusion 60, a shoulder 62, a protrusion and a shoulder, a channel 64, a web 66, a channel and a web, a tab, a stud, a barb, a spur, a hook, an aperture, a slot, a socket, a groove, and a loop. Some coupling mechanisms may include combinations of the above structures, e.g., a latch that includes a protrusion and/or shoulder, and/or multiple structures, e.g., a pair of protrusions and a pair of mating shoulders. Mating structures generally are configured (e.g., sized, shaped, positioned) to engage each other and form a releasable mechanical interlock. The mating structures may be included on respective components such that the mating structures engage to couple the elongate rail member to the coupler (and/or tie member 20). For example, the elongate rail member may include a protrusion, and the coupler (and/or tie member) may include a mating shoulder, or the coupler (and/or tie member) may include a protrusion, and the elongate rail member may include a mating shoulder. Additionally or alternatively, mating structures may be biased toward an engaged and/or a disengaged position, for example by the resilient nature of one or more components of one or more of the mating structures, e.g., a mating structure may include a leaf spring and/or may be spring biased.

Figure 8:
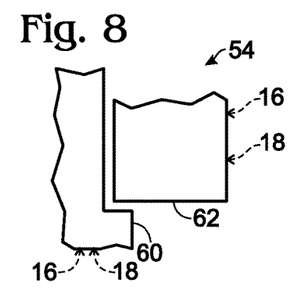
FIG. 8 is a schematic diagram representing illustrative, non-exclusive examples of coupling mechanisms that include a protrusion and a shoulder.
Figure 9:
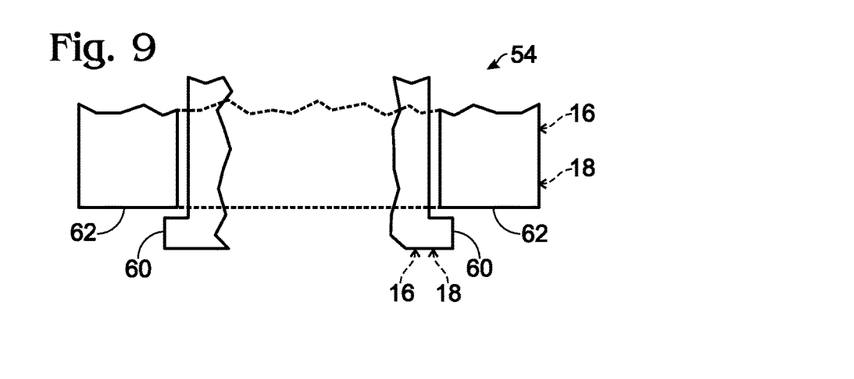
FIG. 9 is a schematic diagram representing illustrative, non-exclusive examples of coupling mechanisms that include a pair of protrusions and a pair of shoulders.

FIG. 8 illustrates a coupling mechanism 54 with a protrusion 60 and a corresponding shoulder 62 that is configured to engage a respective protrusion when the elongate rail member is coupled to the coupler 18 and/or tie member 20. Protrusions 60 additionally or alternatively may be described as tabs. Shoulders 62 additionally or alternatively may be described as or may be defined by slots. A protrusion may be biased so that it is selectively retained by the shoulder when the coupling mechanism is operatively coupling an elongate rail to a coupler. For example, the protrusion may be integral and/or operatively coupled to a tab that defines a leaf spring or other biased structure to permit the protrusion to translate and catch the corresponding shoulder when the coupling mechanism operatively couples an elongate rail member to a coupler (and/or tie member). As illustrated in FIG. 9, some embodiments of coupling mechanisms 54 may include a pair of opposed and spaced-apart protrusions and a pair of spaced-apart shoulders that are configured to respectively engage the pair of opposed and spaced-apart protrusions when the respective elongate rail member is coupled to the respective coupler (and/or tie member).

Figure 10:
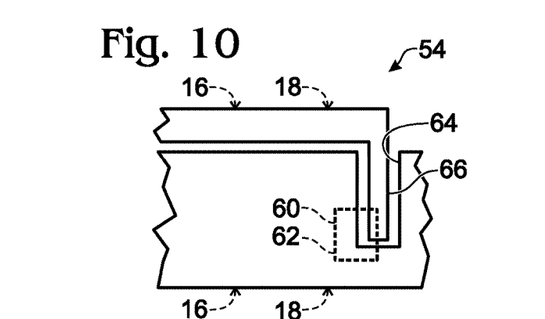
FIG. 10 is a schematic diagram representing illustrative, non-exclusive examples of coupling mechanisms that include a channel and a web.
Figure 11:
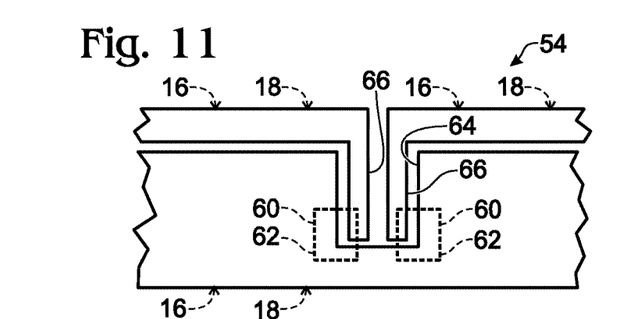
FIG. 11 is a schematic diagram representing illustrative, non-exclusive examples of coupling mechanisms that include a channel sized to receive more than one web.

FIG. 10 illustrates a coupling mechanism 54 with a channel 64 and a web 66 that is sized to be selectively received in the channel when the elongate rail member 16 is coupled to the coupler 18 and/or tie member 20. As illustrated in FIG. 11, a channel 64 may be sized and configured to receive more than one web 66. For example, in embodiments in which the coupler (and/or tie member) defines the channel, one web may correspond to a first elongate rail member, and another web may correspond to a second elongate rail member, with the two elongate rail members being longitudinally aligned and coupled by the coupler (and/or tie member). Channels additionally or alternatively may be described as slots, and webs additionally or alternatively may be described as walls. Moreover, the at least one channel 64 and the at least one web 66 may be keyed, define a key structure 68, or otherwise configured to operatively and properly align an elongate rail member and a coupler (and/or tie member) for operatively coupling therebetween. For example, the at least one channel and/or the at least one web may be asymmetrical so that an elongate rail member is able to be coupled to the coupler (and/or tie member) in only a single, and proper, orientation. Additionally or alternatively, the at least one channel and/or the at least one web may have unique shapes that facilitate proper alignment, engagement, and coupling of an elongate rail member and a coupler.

Figure 12:
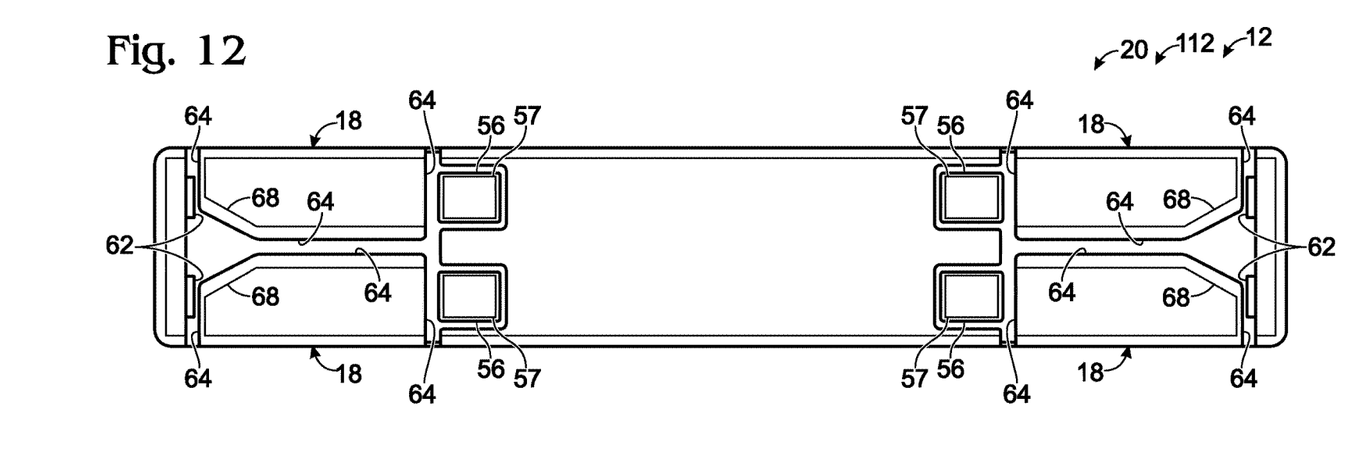
FIG. 12 is a top view of an illustrative, non-exclusive example of a tie member.

FIG. 12 is an illustrative, non-exclusive example of a tie member 20 that includes two couplers 18 (with latches 56, actuators 57, channels 64, and key structures 68) to engage and to releasably couple four elongate rail members 16 with mating structures. In particular, FIG. 12 provides a graphical example of a tie member 20 that optionally is keyed and/or otherwise incorporates key structures to facilitate proper, and thus prevent improper, alignment and coupling of the elongate rail members to the couplers. More specifically, the couplers 18 include a flared, or Y-shaped, channel 64 that defines the key structure and that is sized and shaped to receive the terminal end walls of two longitudinally aligned elongate rail members. Also, the terminal end walls of the example elongate rail members each have a single angled corner, a mating key structure, on one side of the terminal end wall, with this angled corner corresponding to and being configured to mate with the flared portion of the channel of the coupler.

Figures 13, 14, 15:
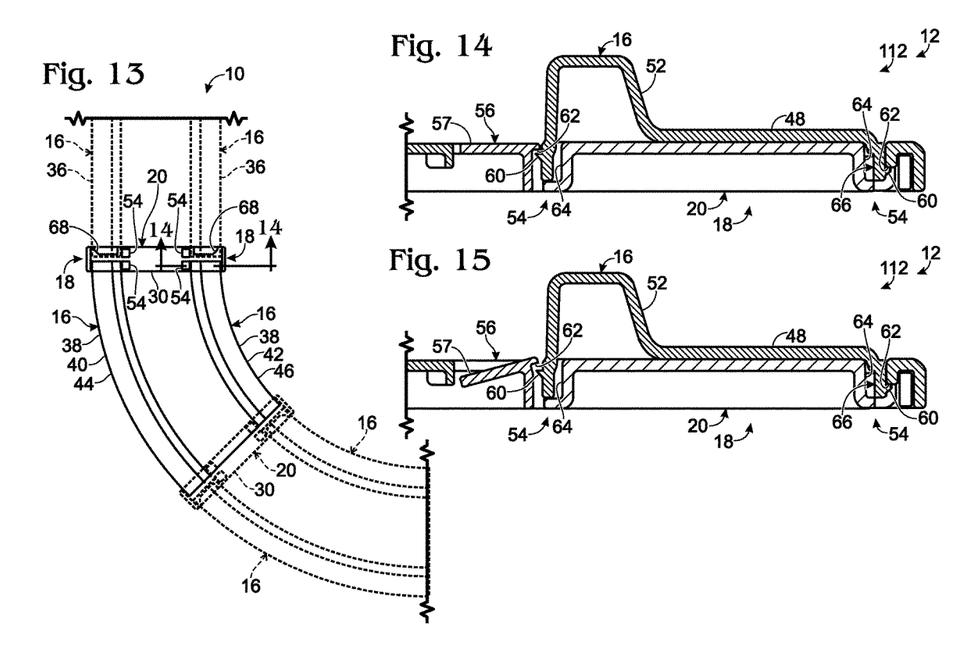
FIG. 13 is a top view of an illustrative, non-exclusive example of a partial track assembly with rail members coupled to tie members in a spaced-apart and parallel relationship.
FIG. 14 is a cross-sectional view along the section line 14-14 of FIG. 13, detailing an illustrative, non-exclusive example of a coupling mechanism defined by an elongate rail member and a tie member, with the latch of the coupling mechanism in its biased position.
FIG. 15 illustrates the coupling mechanism of FIG. 14 with the latch in position for decoupling of the elongate rail member from the tie member.

FIG. 13 is an illustrative, non-exclusive example of a partial track assembly 10 that illustrates a curved track section and a straight track section. The curved track section includes an outer curve rail member 40 and an inner curve rail member 42 operatively coupled to two tie members 20 in a spaced-apart and parallel configuration as left and right rails of the track assembly. The straight track section includes two straight rail members operatively coupled to at least one tie member 20 in a spaced-apart and parallel configuration as left and right rails. The tie members are configured to couple four elongate rail members, potentially including elongate rail members of different types, as shown (straight and curved).

As seen with particular reference to FIGS. 14-15, the coupling mechanisms 54 defined by the couplers 18 and the elongate rail members 16 of track assembly kit 112 include opposed and spaced-apart protrusions 60 integral to the elongate rail members and corresponding shoulders 62 defined by the couplers. Moreover, the coupling mechanisms of track assembly kit 112 include a latch 56 with an actuator 57 that is in the form of a biased lever with a user-engagement pad that when engaged and depressed by a user will operatively permit separation of a protrusion 60 and corresponding shoulder 62. More specifically, in this example, the latch defines a shoulder, and the shoulder pivots away from the corresponding protrusion when a user operatively pivots the actuator.

As also seen with reference to FIGS. 14-15, at least within the regions where the protrusions and the shoulders operatively engage each other, the corresponding channels 64 are sized so as to permit the deflection of the portion of the elongate rail members having the protrusions, and thus to permit decoupling of the elongate rail members from the couplers. Additionally, the protrusions are integral to a flexible, or biased, tab that facilitates the selective translation of the protrusions relative to the corresponding shoulders and thus for decoupling of the elongate rail members from the couplers.

Figure 16:
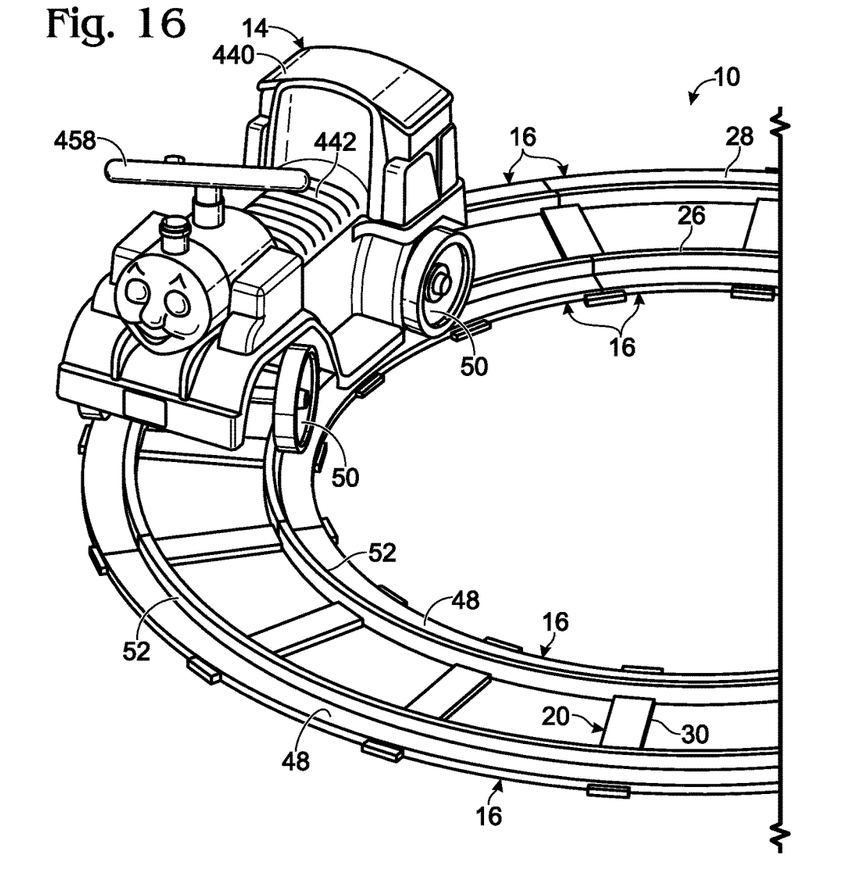
FIG. 16 is a fragmentary perspective view of an illustrative, non-exclusive example of a children's ride-on vehicle operatively positioned on an illustrative, non-exclusive example of a track assembly.

Children's ride-on vehicles 14 according to the present disclosure may be powered vehicles or manually operated (e.g., pedal operated and/or foot-to-floor) vehicles. FIG. 16 depicts an illustrative, non-exclusive example of a powered children's ride-on vehicle 14 operatively positioned on a track assembly 10 according to the present disclosure. Children's ride-on vehicles generally are configured to mimic full-sized vehicles and comprise a reduced-scale vehicle body 440 sized for a child, a seat 442 sized for a child, and a plurality of wheels 50 operatively coupled to the vehicle body. Children's ride-on vehicles are configured to travel by rolling on the plurality of wheels. The plurality of wheels is configured to support the weight of the children's ride-on vehicle, including the weight of a child seated upon the seat of the children's ride-on vehicle. Other illustrative, non-exclusive examples of children's ride-on vehicles that may be used with track assemblies 10 include those disclosed in and/or modified from those disclosed in U.S. Pat. Nos. 5,644,114, 6,509,719, 6,755,265, 6,771,034, 7,413,041, 7,568,753, 7,905,305, 7,939,008, and 8,164,429, the disclosures of which are hereby incorporated by reference.

Figure 17:
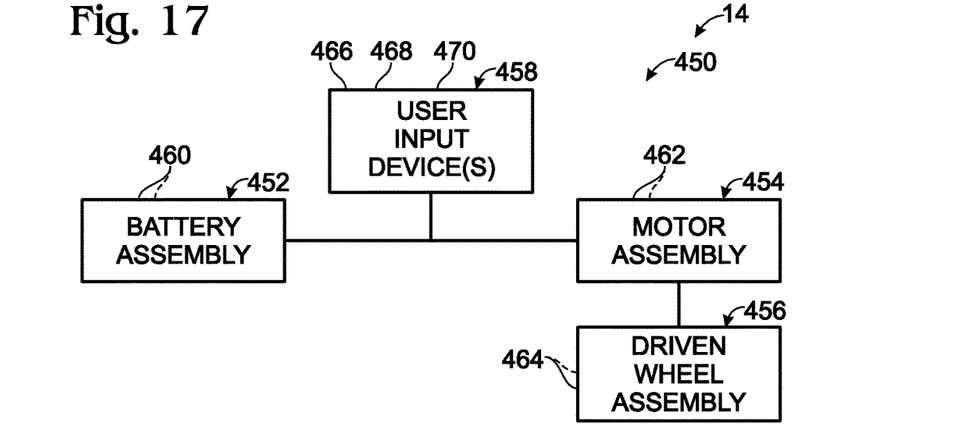
FIG. 17 is a schematic diagram representing a drive assembly of a powered children's ride-on vehicle.

FIG. 17 is a diagram schematically representing optional drive assemblies 450 of a powered children's ride-on vehicle. As schematically represented, a drive assembly may include battery assembly 452, a motor assembly 454 electrically coupled to the battery assembly, a driven wheel assembly 456 coupled to the motor assembly, and one or more user input devices 458.

Battery assembly 452 may include one or more batteries 460 that are adapted to provide power to the motor assembly. The one or more batteries in the battery assembly may have any suitable construction, and in some embodiments may be rechargeable batteries.

Motor assembly 454 includes one or more battery-powered motors 462 that are adapted to drive the rotation of at least one wheel of the driven wheel assembly, which may include one or more driven wheels 464, depending on the configuration of the children's ride-on vehicle.

User input device(s) 458 are adapted to convey inputs from a child seated on the children's ride-on vehicle to the drive assembly. That is, the input device(s) are configured to convey a user's inputs, such as via a wiring harness, to control the actuation of motor assembly 454, such as by causing the actuation (or energizing) of the motor assembly, selecting between a range of electronic configurations, selecting the direction of rotation of the motor assembly's output, selecting the relative degree to which the motor assembly is actuated, etc. An example of a suitable user input device 458 includes (but is not limited to) a drive actuator 466, through which a user input directing battery assembly 452 to energize the motor assembly is received. Examples of suitable drive actuators include an on/off switch, a foot pedal, a throttle lever, and a rotational handgrip on a steering mechanism that includes a handlebar. Other illustrative, non-exclusive examples of user input devices include a speed switch 468, which enables a user to select the relative rate of rotation of the motor assembly's output, and a direction switch 470, which enables a user to select the relative direction or rotation of the motor assembly and thereby selectively configure the children's ride-on vehicle to drive in a forward or reverse direction. When present, the speed switch and the direction switch may be located in any suitable location on the body or steering assembly of the children's ride-on vehicle for actuation by a child seated on the seat of the children's ride-on vehicle.

Illustrative, non-exclusive examples of track assembly kits, track assemblies, and children's ride-on vehicle systems according to the present disclosure are described in the following enumerated paragraphs.

A. A track assembly kit for a children's ride-on vehicle, the track assembly kit comprising:

a plurality of elongate rail members;

a plurality of couplers, each coupler configured to operatively and longitudinally couple together two elongate rail members from the plurality of elongate rail members.

A1. The track assembly kit of paragraph A, further comprising:

a plurality of tie members, each tie member having a left end region and a right end region, and each tie member including a coupler from the plurality of couplers at the left end region and a coupler from the plurality of couplers at the right end region;

wherein the plurality of elongate rail members and the plurality of tie members are configured to be assembled together to form a track assembly with a first subset of the plurality of elongate rail members longitudinally aligned, a second subset of the plurality of elongate rail members longitudinally aligned in a spaced-apart and parallel relation to the first subset of the plurality of elongate rail members, and the plurality of tie members spanning between the first subset of the plurality of elongate rail members and the second subset of the plurality of elongate rail members.

A1.1. The track assembly kit of paragraph A1, wherein the plurality of tie members are configured to be nested and/or stacked together for storage and/or shipment.

A1.2. The track assembly kit of any of paragraphs A1-A1.1, wherein the plurality of tie members is a plurality of elongate tie members.

A1.3. The track assembly kit of any of paragraphs A1-A1.2, wherein the kit includes at least twice as many elongate rail members as tie members.

A1.4. The track assembly kit of any of paragraphs A1-A1.3, wherein the plurality of tie members are configured to space apart the first subset of the plurality of elongate rail members from the second subset of the plurality of elongate rail members by a defined distance.

A2. The track assembly kit of any of paragraphs A-A1.4, wherein the plurality of elongate rail members includes one or more of the following:

a set of left rail members;

a set of right rail members;

a set of straight rail members;

a set of curved rail members;

a set of outer curve rail members;

a set of inner curve rail members; and a set of curved rail members with a relatively larger radius of curvature and a set of curved rail members with a relatively smaller radius of curvature.

A2.1. The track assembly kit of paragraph A2, wherein each set includes at least 2, at least 3, at least 4, at least 6, at least 8, at least 10, at least 16, at least 20, or at least 30 elongate rail members.

A2.2. The track assembly kit of any of paragraphs A2-A2.1, wherein the kit includes at least two different sets of rail members.

A3. The track assembly kit of any of paragraphs A1-A2.2, wherein each of the plurality of elongate rail members includes a support surface configured to support a wheel of a children's ride-on vehicle when the children's ride-on vehicle is driven along a track path defined by the track assembly.

A3.1. The track assembly kit of paragraph A3, wherein each support surface is configured to support at least one wheel of a children's ride-on vehicle as the wheel rolls upon the support surface during operation, and optionally powered operation, of the children's ride-on vehicle.

A4. The track assembly kit of any of paragraphs A-A3.1, wherein each of the plurality of elongate rail members includes a guide surface configured to engage and guide a wheel of a children's ride-on vehicle.

A4.1. The track assembly kit of paragraph A4, wherein the guide surface defines a portion of a track path that is defined by the assembled track assembly.

A4.2. The track assembly kit of any of paragraphs A4-A4.1, wherein the guide surface extends transverse to a/the support surface that is configured to support a wheel of a children's ride-on vehicle.

A4.3. The track assembly kit of any of paragraphs A4-A4.2, wherein the guide surface extends perpendicular to a/the support surface that is configured to support a wheel of a children's ride-on vehicle.

A4.4. The track assembly kit of any of paragraphs A4-A4.2, wherein the guide surface defines an acute exterior angle with a/the support surface that is configured to support a wheel of a children's ride-on vehicle.

A4.5. The track assembly kit of any of paragraphs A4-A4.2, wherein the guide surface defines an obtuse exterior angle with a/the support surface that is configured to support a wheel of a children's ride-on vehicle.

A4.6. The track assembly kit of any of paragraphs A4-A4.2, wherein the guide surface defines an exterior angle that is a reflex angle with a/the support surface that is configured to support a wheel of a children's ride-on vehicle.

A4.7. The track assembly kit of any of paragraphs A4-A4.2, wherein each of the plurality of elongate rail members includes a pair of guide surfaces.

A4.7.1. The track assembly kit of paragraph A4.7, wherein the pair of guide surfaces are generally opposed from each other and/or face generally away from each other.

A4.7.2. The track assembly kit of any of paragraphs A4.7-A4.7.1, wherein the pair of guide surfaces includes one guide surface that extends perpendicular to a/the support surface and one guide surface that does not extend perpendicular to a/the support surface.

A4.8. The track assembly kit of any of paragraphs A4-A4.7.2, wherein the guide surface is configured to be selectively engaged by a wheel of a children's ride-on vehicle to define and/or correct a path of travel of the ride-on vehicle along an assembled track.

A4.9. The track assembly kit of any of paragraphs A4-A4.8, wherein the guide surface is configured to be selectively engaged by a wheel of a children's ride-on vehicle to guide a path of travel of the children's ride-on vehicle as, and optionally at least a substantial portion of the time that, the children's ride-on vehicle is driven along an assembled track.

A4.10. The track assembly kit of any of paragraphs A4-A4.9, wherein the guide surface is configured to be selectively engaged by a wheel of a children's ride-on vehicle to guide a path of travel of the children's ride-on vehicle only when the wheel is steered along a path of travel that does not correspond to the path of travel defined by an assembled track.

A5. The track assembly kit of any of paragraphs A-A4.10, wherein at least a subset of the plurality of elongate rail members are configured to be stacked and/or nested together for storage and/or shipment.

A6. The track assembly kit of any of paragraphs A-A5, wherein the plurality of couplers are configured to operatively and longitudinally couple together two elongate rail members from the plurality of elongate rail members without aid of a tool.

A7. The track assembly kit of any of paragraphs A-A6, wherein the plurality of couplers are configured to operatively and longitudinally couple together two elongate rail members from the plurality of elongate rail members without separate fasteners.

A8. The track assembly kit of any of paragraphs A-A7, wherein each elongate rail member is configured to be manually coupled to a coupler of the plurality of couplers.

A8.1. The track assembly kit of paragraph A8, wherein each elongate rail member is configured to be manually coupled to a pair of couplers of the plurality of couplers, optionally at each longitudinal end of each elongate rail member.

A9. The track assembly kit of any of paragraphs A-A8.1, wherein each elongate rail member is configured to be manually coupled to and manually decoupled from a coupler of the plurality of couplers, and optionally a pair of couplers of the plurality of couplers.

A9.1. The track assembly kit of paragraph A9, when depending from paragraph A1, wherein each tie member includes at least two, and optionally four couplers.

A10. The track assembly kit of any of paragraphs A-A9.1, wherein each coupler is configured to operatively and longitudinally couple together different types of elongate rail members, wherein types include straight rail members, curved rail members, outer curve rail members, and inner curve rail members.

A11. The track assembly kit of any of paragraphs A-A10, wherein each elongate rail member is configured to be coupled to a coupler in at least one of a snap-fit arrangement and a friction-fit arrangement.

A12. The track assembly kit of any of paragraphs A-A11, wherein each elongate rail member is configured to be releasably coupled to a coupler.

A13. The track assembly kit of any of paragraphs A-A12, wherein each elongate rail member is configured to be releasably and repeatedly coupled to a coupler, and optionally a pair of couplers, without damage to or destruction of the elongate rail member or the coupler(s).

A14. The track assembly kit of any of paragraphs A-A13, wherein each coupler is configured to be releasably and repeatedly coupled to an elongate rail member, and optionally at least two elongate rail members, and further optionally four elongate rail members, without damage to or destruction of the elongate rail member or the coupler.

A15. The track assembly kit of any of paragraphs A1-A14 when depending from paragraph A1, wherein at least a plurality of the elongate rail members and a plurality of the tie members are configured to be assembled to form a track assembly with two substantially parallel rails and a track base.

A15.1. The track assembly kit of paragraph A15, wherein the two substantially parallel rails protrude and/or extend above the track base when the track is in an operational position.

A15.2. The track assembly kit of any of paragraphs A15-A15.1, wherein the two substantially parallel rails include the plurality of elongate rail members, optionally wherein the two substantially parallel rails are composed of the plurality of elongate rail members.

A15.3. The track assembly kit of any of paragraphs A15-A15.2, when depending from paragraph A1, wherein the track base includes the plurality of tie members.

A15.4. The track assembly kit of any of paragraphs A15-A15.3, wherein the plurality of elongate rail members includes at least two straight elongate rail members, and optionally wherein the two straight elongate rail members are configured to cooperatively form a straight track section with a substantially constant track gauge.

A15.5. The track assembly kit of any of paragraphs A15-A15.4, wherein the plurality of elongate rail members includes at least one inner curve elongate rail member and one outer curve elongate rail member, and optionally wherein the inner curve elongate rail member and the outer curve elongate rail member are configured to cooperatively form a curved track section with a substantially constant track gauge along a substantial length of the curved track section, optionally wherein one or both ends of the curved track section have a gauge that is wider or narrower than the substantially constant track gauge.

A15.6. The track assembly kit of any of paragraphs A15-A15.5, wherein the track assembly kit is configured to form a straight track section with a first track gauge and a curved track section with a second track gauge.

A15.6.1. The track assembly kit of paragraph A15.6, wherein the first track gauge is substantially equal to the second track gauge.

A15.6.2. The track assembly kit of paragraph A15.6, wherein the first track gauge is less than the second track gauge, and wherein the track assembly kit is configured to form a transition zone between the first track gauge and the second track gauge.

A15.6.3. The track assembly kit of paragraph A15.6, wherein the first track gauge is greater than the second track gauge, and wherein the track assembly kit is configured to form a transition zone between the first track gauge and the second track gauge.

A16. The track assembly kit of any of paragraphs A-A15.6.3, wherein a respective elongate rail member and a respective coupler collectively define a coupling mechanism.

A16.1. The track assembly kit of paragraph A16, wherein the coupling mechanism is configured to automatically retain the respective elongate rail member to the respective coupler when a user selectively urges the respective elongate rail member against the respective coupler or the respective coupler against the respective elongate rail member.

A16.2. The track assembly kit of any of paragraphs A16-A16.1, wherein the coupling mechanism is configured to release the respective elongate member from the respective coupler only upon user engagement of the coupling mechanism.

A16.3. The track assembly kit of any of paragraphs A16-A16.2, wherein the coupling mechanism includes an actuator that is configured to release the respective elongate member responsive to user engagement of the actuator, and optionally wherein the actuator includes at least one of a lever, a button, a push button, a pivot, a depressible member, a depressible region, and a slide.

A16.4. The track assembly kit of any of paragraphs A16-A16.3, wherein the coupling mechanism is configured to be repeatedly used to secure and release the respective elongate rail member to the respective coupler without damage to at least one of the coupling mechanism, the respective elongate rail member, and the respective coupler.

A16.5. The track assembly kit of any of paragraphs A16-A16.4, wherein the coupling mechanism is configured to secure and release the respective elongate rail member and the respective coupler without requiring the use of tools.

A16.6. The track assembly kit of any of paragraphs A16-A16.5, wherein the coupling mechanism is free of separate fasteners.

A16.7. The track assembly kit of any of paragraphs A16-A16.6, wherein the coupling mechanism includes a latch.

A16.7.1. The track assembly kit of paragraph A16.7, wherein the respective elongate rail member includes the latch.

A16.7.2. The track assembly kit of paragraph A16.7, wherein the respective coupler includes the latch.

A16.8. The track assembly kit of any of paragraphs A16-A16.7.2, wherein the coupling mechanism includes:
a protrusion; and
a shoulder configured to engage the protrusion when the respective elongate rail member is coupled to the respective coupler.

A16.8.1. The track assembly kit of paragraph A16.8 when depending from paragraph A16.7, wherein the latch includes the shoulder.

A16.8.2. The track assembly kit of any of paragraphs A16.8-A16.8.1 when depending from paragraph A16.7, wherein the latch includes the protrusion.

A16.8.3. The track assembly kit of any of paragraphs A16.8-A16.8.2, wherein the respective elongate rail member includes the protrusion and the respective coupler includes the shoulder.

A16.8.4. The track assembly kit of any of paragraphs A16-A16.8.2, wherein the respective elongate rail member includes the shoulder and the respective coupler includes the protrusion.

A16.8.5. The track assembly kit of any of paragraphs A16.8-A16.8.4, wherein the protrusion is spring-biased.

A16.9. The track assembly kit of any of paragraphs A16-A16.8.5, wherein the coupling mechanism includes:
a pair of opposed and spaced-apart protrusions; and
a pair of spaced-apart shoulders configured to respectively engage the pair of opposed and spaced-apart protrusions when the respective elongate rail member is coupled to the respective coupler.

A16.9.1. The track assembly kit of paragraph A16.9 when depending from paragraph A16.7, wherein the latch includes one of the shoulders of the pair of spaced-apart shoulders.

A16.9.2. The track assembly kit of any of paragraphs A16.9-A16.9.1, when depending from paragraph A16.7, wherein the latch includes one of the protrusions of the pair of opposed and spaced-apart protrusions.

A16.9.3. The track assembly kit of any of paragraphs A16.9-A16.9.2, wherein the respective elongate rail member includes the pair of opposed and spaced-apart protrusions and the respective coupler includes the pair of spaced-apart shoulders.

A16.9.4. The track assembly kit of any of paragraphs A16.9-A16.9.2, wherein the respective elongate rail member includes the pair of spaced-apart shoulders and the respective coupler includes the pair of opposed and spaced-apart protrusions.

A16.9.5. The track assembly kit of any of paragraphs A16.9-A16.9.4, wherein one or both of the pair of opposed and spaced-apart protrusions are spring-biased.

A16.10. The track assembly kit of any of paragraphs A16-A16.9.5, wherein the coupling mechanism includes:
at least one channel; and
at least one web sized to be selectively received in the at least one channel when the respective elongate rail member is coupled to the respective coupler.

A16.10.1. The track assembly kit of paragraph A16.10, wherein the respective elongate rail member includes the at least one channel and the respective coupler includes the at least one web.

A16.10.2. The track assembly kit of paragraph A16.10, wherein the respective elongate rail member includes the at least one web and the respective coupler includes the at least one channel.

A16.10.3. The track assembly kit of any of paragraphs A16.10-A16.10.2, wherein the at least one channel and the at least one web define a key structure configured to facilitate proper alignment and engagement between the respective elongate rail member and the respective coupler.

A16.11. The track assembly kit of any of paragraphs A16-A16.10.3, wherein the coupling mechanism includes at least one of a protrusion, a latch, a catch, a tab, a stud, a barb, a spur, a hook, an aperture, a slot, a socket, a groove, and a loop.

A16.12. The track assembly kit of any of paragraphs A16-A16.11, wherein the coupler includes at least one of a protrusion, a latch, a catch, a tab, a stud, a barb, a spur, a hook, an aperture, a slot, a socket, a groove, and a loop.

A16.13. The track assembly kit of any of paragraphs A16-A16.12, wherein the elongate rail member includes at least one of a protrusion, a latch, a catch, a tab, a stud, a barb, a spur, a hook, an aperture, a slot, a socket, a groove, and a loop.

A16.14. The track assembly kit of any of paragraphs A16-A16.13, wherein each coupling mechanism includes a release member configured to release, optionally to manually release, the elongate rail member from the coupler.

A16.15. The track assembly kit of any of paragraphs A16-A16.14, wherein each coupling mechanism includes a coupling mechanism retainer configured to retain the elongate rail member coupled to the coupler.

A16.16. The track assembly kit of any of paragraphs A16-A16.15, wherein the coupling mechanism is configured to release and retain elongate rail members of different types, wherein types include straight rail members, curved rail members, outer curve rail members, and inner curve rail members.

A17. The track assembly kit of any of paragraphs A-A16.16, wherein one or more elongate rail members and couplers include a key structure that is configured to facilitate proper alignment and engagement between respective elongate rail members and respective couplers.

B. A track assembly for a children's ride-on vehicle, the track assembly comprising:
  a first set of elongate rail members longitudinally, releasably coupled together by at least two tie members to define a left rail; and
  a second set of elongate rail members longitudinally, releasably coupled together by at least two tie members to define a right rail;
  wherein the tie members laterally space apart the left rail and right rail in a parallel relationship.

B1. The track assembly of paragraph B, wherein the track assembly is assembled from the track assembly kit of any of paragraphs A-A17, and wherein the plurality of elongate rail members includes the first set of elongate rail members and the second set of elongate rail members, and optionally wherein the plurality of elongate rail members are operatively and longitudinally coupled together by the plurality of couplers.

B2. The track assembly of any of paragraphs B-B1, wherein the track assembly defines a track path, wherein the track assembly is configured to guide a children's ride-on vehicle along the track path.

B3. The track assembly of any of paragraphs B-B2, wherein the tie members are elongate tie members.

B4. The track assembly of any of paragraphs B-B3, wherein the track assembly includes an even number of elongate rail members.

B5. The track assembly of any of paragraphs B-B4, wherein the track assembly includes twice as many elongate rail members as tie members.

B6. The track assembly of any of paragraphs B-B5, wherein the first set of elongate rail members is a set of left rail members and the second set of elongate rail members is a set of right rail members.

B7. The track assembly of any of paragraphs B-B6, wherein the first set of elongate rail members and/or the second set of elongate rail members include one or more of the following:
  a set of straight rail members;
  a set of curved rail members;
  a set of outer curve rail members;
  a set of inner curve rail members; and
  a set of curved rail members with a relatively larger radius of curvature and a set of curved rail members with a relatively smaller radius of curvature.

B8. The track assembly of any of paragraphs B-B7, wherein the left rail and the right rail each includes a support surface configured to support a wheel of a children's ride-on vehicle.

B8.1. The track assembly kit of paragraph B8, wherein each support surface is configured to support at least one wheel of a children's ride-on vehicle as the wheel rolls upon the support surface during operation, and optionally powered operation, of the children's ride-on vehicle.

B9. The track assembly of any of paragraphs B-B8.1, wherein the left rail and the right rail each includes a guide surface configured to engage and guide a wheel of a children's ride-on vehicle.

B9.1. The track assembly of paragraph B9, wherein the guide surface defines a portion of a/the track path.

B9.2. The track assembly of any of paragraphs B9-B9.1, wherein the guide surface extends transverse to a/the support surface that is configured to support a wheel of a children's ride-on vehicle.

B9.3. The track assembly of any of paragraphs B9-B9.2, wherein the guide surface extends perpendicular to a/the support surface that is configured to support a wheel of a children's ride-on vehicle.

B9.4. The track assembly of any of paragraphs B9-B9.2, wherein the guide surface defines an acute exterior angle with a/the support surface that is configured to support a wheel of a children's ride-on vehicle.

B9.5. The track assembly of any of paragraphs B9-B9.2, wherein the guide surface defines an obtuse exterior angle with a/the support surface that is configured to support a wheel of a children's ride-on vehicle.

B9.6. The track assembly of any of paragraphs B9-B9.2, wherein the guide surface defines an exterior angle that is a reflex angle with a/the support surface that is configured to support a wheel of a children's ride-on vehicle.

B9.7. The track assembly of any of paragraphs B9-B9.2, wherein each of the left rail and the right rail includes a pair of guide surfaces.

B9.7.1. The track assembly of paragraph B9.7, wherein the pair of guide surfaces are generally opposed from each other and/or face generally away from each other.

B9.7.2. The track assembly of any of paragraphs B9.7-B9.7.1, wherein the pair of guide surfaces include one guide surface that extends perpendicular to a/the support surface and one guide surface that does not extend perpendicular to a/the support surface.

B9.8. The track assembly of any of paragraphs B9-B9.7.2, wherein the guide surface is configured to be selectively engaged by a wheel of a children's ride-on vehicle to define and/or correct a path of travel of the ride-on vehicle along the track assembly.

B9.9. The track assembly of any of paragraphs B9-B9.8, wherein the guide surface is configured to be selectively engaged by a wheel of a children's ride-on vehicle to guide a path of travel of the children's ride-on vehicle as, and optionally at least a substantial portion of the time that, the children's ride-on vehicle is driven along the track assembly.

B9.10. The track assembly of any of paragraphs B9-B9.9, wherein the guide surface is configured to be selectively engaged by a wheel of a children's ride-on vehicle to guide a path of travel of the children's ride-on vehicle only when the wheel is steered along a path of travel that does not correspond to the path of travel defined by the track assembly.

B10. The track assembly of any of paragraphs B-B9.10, wherein the tie members are configured to operatively, longitudinally, releasably, and repeatedly, and optionally manually, couple and/or decouple two elongate rail members from the first set of elongate rail members and/or the second set of elongate rail members without separate fasteners and/or without aid of a tool.

B11. The track assembly of any of paragraphs B-B10, wherein each elongate rail member is configured to be coupled to and decoupled from at least two tie members, optionally at each longitudinal end of each elongate rail member.

B12. The track assembly of any of paragraphs B-B11, wherein each tie member is configured to be coupled to and decoupled from at least one rail member of the first set and at least one rail member of the second set.

B13. The track assembly of any of paragraphs B-B12, wherein each elongate rail member is coupled to a tie member in at least one of a snap-fit arrangement and a friction-fit arrangement.

B14. The track assembly of any of paragraphs B-B13, wherein each elongate rail member is configured to be releasably and repeatedly coupled to the tie members without damage to or destruction of the elongate rail member or the tie members.

B15. The track assembly of any of paragraphs B-B14, wherein each tie member is configured to be releasably and repeatedly coupled to an elongate rail member, and optionally at least two elongate rail members, and further optionally four elongate rail members, without damage to or destruction of the elongate rail member or the tie member.

B16. The track assembly of any of paragraphs B-B15, wherein the left rail and the right rail cooperatively form a straight track section, optionally with a substantially constant straight track gauge.

B17. The track assembly of any of paragraphs B-B16, wherein the left rail and the right rail cooperatively form a curved track section, optionally with a substantially constant curved track gauge.

B17.1 The track assembly of paragraph B17, when also depending from paragraph B16, wherein the straight track gauge is substantially equal to the curved track gauge.

B18. The track assembly of any of paragraphs B-B17.1, wherein the left rail and the right rail cooperatively form a transition track section between a straight track section with a straight track gauge and a curved track section with a curved track gauge that is different than the straight track gauge, and wherein the transition track section has a track gauge that varies from the straight track gauge at one end to the curved track gauge at the other end.

B19. The track assembly of any of paragraphs B-B18, wherein each tie member includes a left coupler coupling the tie member to the left rail and a right coupler coupling the tie member to the right rail, wherein an elongate rail member of the left rail and the left coupler collectively define a left coupling mechanism, wherein an elongate rail member of the right rail and the right coupler collectively define a right coupling mechanism, and optionally wherein each tie member includes a left end region including the left coupler and a right end region including the right coupler.

B19.1. The track assembly of paragraph B19, wherein the left coupling mechanism and the right coupling mechanism are configured to automatically retain the respective (i.e., left and right) elongate rail member to the respective tie member when a user selectively urges the respective elongate rail member against the respective tie member or the respective tie member against the respective elongate rail member.

B19.2. The track assembly of any of paragraphs B19-B19.1, wherein the left coupling mechanism and the right coupling mechanism are configured to release the respective elongate member from the respective tie member only upon user engagement of the coupling mechanism.

B19.3. The track assembly of any of paragraphs B19-B19.2, wherein the left coupling mechanism and/or the right coupling mechanism includes an actuator that is configured to release the respective elongate member responsive to user engagement of the actuator, and optionally wherein the actuator includes at least one of a lever, a button, a push button, a pivot, a depressible member, a depressible region, and a slide.

B19.4. The track assembly of any of paragraphs B19-B19.3, wherein the left coupling mechanism and the right coupling mechanism are configured to secure and release the respective elongate rail member and the respective tie member without requiring the use of tools.

B19.5. The track assembly of any of paragraphs B19-B19.4, wherein the left coupling mechanism and the right coupling mechanism are free of separate fasteners.

B19.6. The track assembly of any of paragraphs B19-B19.5, wherein the left coupling mechanism and the right coupling mechanism each independently includes:
 a protrusion; and
 a shoulder configured to engage the protrusion when the respective elongate rail member is coupled to the respective tie member.

B19.6.1. The track assembly of paragraph B19.6, wherein the left coupling mechanism and the right coupling mechanism each independently includes a latch that includes the shoulder.

B19.6.2. The track assembly of any of paragraphs B19.6-B19.6.1, wherein the left coupling mechanism and the right coupling mechanism each independently includes a latch that includes the protrusion.

B19.6.3. The track assembly of any of paragraphs B19.6-B19.6.2, wherein the respective elongate rail member includes the protrusion and the respective tie member includes the shoulder.

B19.6.4. The track assembly of any of paragraphs B19-B19.6.2, wherein the respective elongate rail member includes the shoulder and the respective tie member includes the protrusion.

B19.6.5. The track assembly of any of paragraphs B19.6-B19.6.4, wherein the protrusion is spring-biased.

B19.7. The track assembly of any of paragraphs B19-B19.6.5, wherein the left coupling mechanism and the right coupling mechanism each independently includes:
 a pair of opposed and spaced-apart protrusions; and
 a pair of spaced-apart shoulders configured to respectively engage the pair of opposed and spaced-apart protrusions when the respective elongate rail member is coupled to the respective tie member.

B19.7.1. The track assembly of paragraph B19.7, wherein the left coupling mechanism and the right coupling mechanism each independently includes a latch that includes one of the shoulders of the pair of spaced-apart shoulders.

B19.7.2. The track assembly of any of paragraphs B19.7-B19.7.1, wherein the left coupling mechanism and the right coupling mechanism each independently includes a latch that includes one of the protrusions of the pair of opposed and spaced-apart protrusions.

B19.7.3. The track assembly of any of paragraphs B19.7-B19.7.2, wherein the respective elongate rail member includes the pair of opposed and spaced-apart protrusions and the respective tie member includes the pair of spaced-apart shoulders.

B19.7.4. The track assembly of any of paragraphs B19.7-B19.7.2, wherein the respective elongate rail member includes the pair of spaced-apart shoulders and the respective tie member includes the pair of opposed and spaced-apart protrusions.

B19.7.5. The track assembly of any of paragraphs B19.7-B19.7.4, wherein one or both of the pair of opposed and spaced-apart protrusions are spring-biased.

B19.8. The track assembly of any of paragraphs B19-B19.7.5, wherein the left coupling mechanism and the right coupling mechanism each independently includes:
    at least one channel; and
    at least one web sized to be selectively received in the at least one channel when the respective elongate rail member is coupled to the respective tie member.

B19.8.1. The track assembly of paragraph B19.8, wherein the respective elongate rail member includes the at least one channel and the respective tie member includes the at least one web.

B19.8.2. The track assembly of paragraph B19.8, wherein the respective elongate rail member includes the at least one web and the respective tie member includes the at least one channel.

B19.8.3. The track assembly of any of paragraphs B19.8-B19.8.2, wherein the at least one channel and the at least one web define a key structure configured to facilitate proper alignment and engagement between the respective elongate rail member and the respective tie member.

B19.9. The track assembly of any of paragraphs B19-B19.8.3, wherein the left coupling mechanism and the right coupling mechanism each independently includes at least one of a protrusion, a latch, a catch, a tab, a stud, a barb, a spur, a hook, an aperture, a slot, a socket, a groove, and a loop.

B19.10. The track assembly of any of paragraphs B19-B19.9, wherein the tie member includes at least one of a protrusion, a latch, a catch, a tab, a stud, a barb, a spur, a hook, an aperture, a slot, a socket, a groove, and a loop.

B19.11. The track assembly of any of paragraphs B19-B19.10, wherein the elongate rail member includes at least one of a protrusion, a latch, a catch, a tab, a stud, a barb, a spur, a hook, an aperture, a slot, a socket, a groove, and a loop.

B19.12. The track assembly of any of paragraphs B19-B19.11, wherein the left coupling mechanism and the right coupling mechanism each independently includes a release member configured to release, optionally to manually release, the elongate rail member from the coupler.

B19.13. The track assembly of any of paragraphs B19-B19.12, wherein the left coupling mechanism and the right coupling mechanism each independently includes a coupling mechanism retainer configured to retain the elongate rail member coupled to the coupler.

B19.14. The track assembly of any of paragraphs B19-B19.13, wherein the left coupling mechanism and the right coupling mechanism each independently is configured to release and retain elongate rail members of different types, wherein types include straight rail members, curved rail members, outer curve rail members, and inner curve rail members.

B20. The track assembly of any of paragraphs B-B19.14, wherein one or more of the elongate rail members and the tie members include a key structure that is configured to facilitate proper alignment and engagement between respective elongate rail members and respective tie members.

C. A track assembly kit for a children's ride-on vehicle, the track assembly kit comprising:
    a plurality of elongate rail members; and
    a plurality of tie members, each tie member including a left end region with a left coupler and a right end region with a right coupler;
    wherein the plurality of elongate rail members and the plurality of tie members are configured to be assembled together to form a track assembly for a children's ride-on vehicle.

C1. The track assembly kit of paragraph C, wherein the track assembly is the track assembly of any of paragraphs B-B20.

D. A children's ride-on vehicle system, comprising:
    the track assembly kit of any of paragraphs A-A17 or paragraphs C-C1; and
    a children's ride-on vehicle, comprising:
    a vehicle body including a seat sized for a child; and
    a plurality of wheels operatively coupled to the vehicle body.

D1. The system of paragraph D, wherein the track assembly kit is configured to form a track assembly defining a track path, wherein the track assembly is configured to guide the children's ride-on vehicle along the track path, and wherein the children's ride-on vehicle is configured to travel along the track path.

D2. The system of any of paragraphs D-D1, wherein the plurality of wheels includes at least one driven wheel, and further wherein the children's ride-on vehicle includes a drive assembly adapted to drive the rotation of the at least one driven wheel.

D2.1. The system of paragraph D2, wherein the drive assembly is battery powered.

D2.2. The system of any of paragraphs D2-D2.1, wherein the children's ride-on vehicle includes a motor operatively coupled to, and configured to drive, the at least one driven wheel of the plurality of wheels.

D3. The system of any of paragraphs D-D2.2, wherein the plurality of wheels includes at least one steerable wheel, and further wherein the children's ride-on vehicle includes a steering assembly configured to receive and convey steering inputs to the at least one steerable wheel.

D3.1. The system of paragraph D3, wherein the steering assembly includes a steering mechanism that is configured to receive steering inputs from a child sitting on the seat of the children's ride-on vehicle.

INDUSTRIAL APPLICABILITY

The systems and methods disclosed herein are applicable to the toy vehicle and children's products industries.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

The invention claimed is:

1. A children's ride-on vehicle system, comprising:
   a children's ride-on vehicle, comprising:
      a vehicle body including a seat sized for a child; and
      a plurality of wheels operatively coupled to the vehicle body; and
   a track assembly kit, comprising:
      a plurality of elongate rail members;
      a plurality of couplers, each coupler configured to operatively and longitudinally couple together two elongate rail members from the plurality of elongate rail members; and
      a plurality of tie members, each tie member having a left end region and a right end region, and each tie member including a coupler from the plurality of couplers at the left end region and a coupler from the plurality of couplers at the right end region;
      wherein a respective elongate rail member and a respective coupler collectively define a coupling mechanism that is configured to releasable and repeatedly couple the respective elongate rail member and the respective coupler together, wherein the coupling mechanism includes:
         a catch;
         a latch with a shoulder configured to selectively engage the catch to couple the respective elongate rail member to the respective coupler; and
         an actuator extending from the shoulder and configured to release the respective elongate rail member responsive to user engagement of the actuator;
      wherein the plurality of elongate rail members and the plurality of tie members are configured to be assembled together to form a track assembly defining a track path, with a first subset of the plurality of elongate rail members longitudinally aligned, a second subset of the plurality of elongate rail members longitudinally aligned in a spaced-apart and parallel relation to the first subset of the plurality of elongate rail members, and the plurality of tie members spanning between the first subset of the plurality of elongate rail members and the second subset of the plurality of elongate rail members; and
      wherein the track assembly is configured to guide the children's ride-on vehicle along the track path, and wherein the children's ride-on vehicle is configured to travel along the track path.

2. The children's ride-on vehicle system of claim 1, wherein the plurality of tie members are configured to space apart the first subset of the plurality of elongate rail members from the second subset of the plurality of elongate rail members by a defined distance.

3. The children's ride-on vehicle system of claim 1, wherein the plurality of elongate rail members includes a set of straight rail members and a set of curved rail members.

4. The children's ride-on vehicle system of claim 1, wherein each of the plurality of elongate rail members includes a support surface configured to support a wheel of a children's ride-on vehicle when the children's ride-on vehicle is driven along a track path defined by the track assembly.

5. The children's ride-on vehicle system of claim 4, wherein the respective elongate rail member has a first lateral side region and a distinct second lateral side region, and wherein the support surface extends between the first lateral side region and the second lateral side region.

6. The children's ride-on vehicle system of claim 5, wherein the first lateral side region of the respective elongate rail member includes the catch, and wherein the respective coupler includes the latch.

7. The children's ride-on vehicle system of claim 6, wherein the second lateral side region of the respective elongate rail member includes a protrusion, and wherein the respective coupler includes a slot configured to engage the protrusion to restrict movement of at least the second lateral side region of the respective elongate rail member relative to the respective coupler when the respective elongate rail member is coupled to the respective coupler.

8. The children's ride-on vehicle system of claim 1, wherein each of the plurality of elongate rail members includes a guide surface configured to engage and guide a wheel of a children's ride-on vehicle.

9. The children's ride-on vehicle system of claim 1, wherein the plurality of couplers are configured to operatively and longitudinally couple together two elongate rail members from the plurality of elongate rail members without aid of a tool.

10. The children's ride-on vehicle system of claim 1, wherein each elongate rail member is configured to be coupled to a coupler in a snap-fit arrangement.

11. The children's ride-on vehicle system of claim 1, wherein each elongate rail member is configured to be releasably and repeatedly coupled to a pair of couplers, without damage to or destruction of the elongate rail member or the couplers.

12. The children's ride-on vehicle system of claim 1, wherein the coupling mechanism is configured to release and retain elongate rail members of different types, wherein the different types include straight rail members, curved rail members, outer curve rail members, and inner curve rail members.

13. The children's ride-on vehicle system of claim 1, wherein the coupling mechanism is configured to automatically retain the respective elongate rail member to the respective coupler when a user selectively urges the respective elongate rail member against the respective coupler or the respective coupler against the respective elongate rail member.

14. The children's ride-on vehicle system of claim 1, wherein the actuator includes at least one of a lever, a button, a push button, a pivot, a depressible member, a depressible region, and a slide.

15. The children's ride-on vehicle system of claim 1, wherein the plurality of elongate rail members and the plurality of couplers include a key structure that is configured to facilitate proper alignment and engagement between respective elongate rail members and respective couplers.

16. The children's ride-on vehicle system of claim 1, wherein the children's ride-on vehicle is a battery powered children's ride-on vehicle that includes a drive assembly comprising a battery assembly, a motor assembly electrically coupled to the battery assembly, and a driven wheel assembly coupled to the motor assembly and configured to be rotatably driven thereby; wherein the driven wheel assembly includes at least one wheel of the plurality of wheels.

17. The children's ride-on vehicle system of claim 1, wherein the latch is configured to engage the catch without extending through the respective elongate rail member.

18. The children's ride-on vehicle system of claim 1, wherein the actuator and the shoulder of the latch form a lever with a fulcrum positioned between the actuator and the shoulder.

19. The children's ride-on vehicle system of claim 1, wherein the actuator is configured to pivot into a slot defined in the respective tie member to disengage the latch from the catch.

* * * * *

UNITED STATES PATENT AND TRADEMARK OFFICE
CERTIFICATE OF CORRECTION

PATENT NO. : 9,623,342 B2  
APPLICATION NO. : 14/272740  
DATED : April 18, 2017  
INVENTOR(S) : John D. DeRubes and Kevin M. Gastle It is certified that error appears in the above-identified patent and that said Letters Patent is hereby corrected as shown below:

In the Claims

Column 24, Line 13, after "that is configured to" please delete "releasable" and insert --releasably--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*